US011279570B2

(12) United States Patent
Hartmann

(10) Patent No.: US 11,279,570 B2
(45) Date of Patent: Mar. 22, 2022

(54) ARRANGEMENT FOR PROCESSING A SHIPMENT

(71) Applicant: Deutsche Post AG, Bonn (DE)

(72) Inventor: Bernd Hartmann, Grafschaft-Leimersdorf (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 17/012,126

(22) Filed: Sep. 4, 2020

(65) Prior Publication Data

US 2021/0070555 A1 Mar. 11, 2021

(30) Foreign Application Priority Data

Sep. 5, 2019 (DE) ...................... 10 2019 123 805.6

(51) Int. Cl.
*B65G 47/94* (2006.01)
(52) U.S. Cl.
CPC .... *B65G 47/945* (2013.01); *B65G 2814/0311* (2013.01)
(58) Field of Classification Search
CPC .......... B65G 47/945; B65G 2814/0311; B65G 67/00; B65G 67/08; B07C 1/04
See application file for complete search history.

(56) References Cited

U.S. PATENT DOCUMENTS 3,928,114 A * 12/1975 Aylon ..................... E04G 21/20
156/351
5,642,803 A * 7/1997 Tanaka ................. B65G 1/1378
198/535

(Continued)

FOREIGN PATENT DOCUMENTS

CN 102556688 7/2012
CN 105836408 8/2016
(Continued)

OTHER PUBLICATIONS

German Office Action (with English translation) for corresponding German Application No. 10 2019 123 805.6, dated May 18, 2020, 11 pages.

(Continued)

*Primary Examiner* — William R Harp
(74) *Attorney, Agent, or Firm* — Dority & Manning, P.A.

(57) ABSTRACT

The invention relates to a package collecting apparatus for a package handling installation for unloading a plurality of packages from a transport supply means of the package handling installation and moving unloaded packages to a transport discharge means of the package handling installation, wherein the package collecting apparatus comprises a collecting element, which has a bearing surface for at least one package during the movement from the transport supply means to the transport discharge means, and at least one lateral element arranged thereon which can be moved between an inoperative position and a working position and which has a further bearing surface for at least one package, wherein, with the lateral element in the working position, the bearing surface of the lateral element adjoins the bearing surface of the collecting element flush, and the package collecting apparatus additionally comprises a coupling device for mechanical releasable coupling to the transport discharge means. The invention additionally relates to a package handling installation comprising such a package collecting apparatus.

11 Claims, 3 Drawing Sheets

(56) References Cited

U.S. PATENT DOCUMENTS

| | | | | |
|---|---|---|---|---|
| 5,716,184 A | * | 2/1998 | Lowe | B65G 67/08 414/398 |
| 7,469,782 B2 | * | 12/2008 | Hutton | B65G 67/08 198/812 |
| 2003/0070591 A1 | | 4/2003 | Shabram | |

FOREIGN PATENT DOCUMENTS

| | | | | |
|---|---|---|---|---|
| CN | 108455318 | | 8/2018 | |
| CN | 207810518 | | 9/2018 | |
| CN | 209003133 | | 6/2019 | |
| DE | 102010033115 A1 | | 2/2012 | |
| DE | 102012003439 A1 | | 8/2013 | |
| EP | 0927689 | | 7/1999 | |
| WO | WO-9854073 A1 | * | 12/1998 | B64F 1/324 |

OTHER PUBLICATIONS

Chinese Office Action (with English translation) for corresponding CN Application No. 202010932894.3, dated Jan. 6, 2022, 21 pages.

* cited by examiner

ARRANGEMENT FOR PROCESSING A SHIPMENT

PRIORITY CLAIM

The present application is based on and claims priority to German Patent Application No. 10 2019 123 805.6, having a filing date of Sep. 5, 2019, which is incorporated by reference herein.

TECHNICAL FIELD

The invention relates to a package collecting apparatus for a package handling installation for unloading a plurality of packages from a transport supply means of the package handling installation and moving unloaded packages to a transport discharge means of the package handling installation. It additionally relates to a package handling installation comprising such a package collecting apparatus.

BACKGROUND OF THE INVENTION

Mechanized and automated unloading apparatuses are known from the prior art. Also known from the prior art are package collecting devices which are fixedly integrated in such unloading apparatuses and which usually require high degrees of investment when a new technology is introduced by a user. Moreover, they generally require specific control technologies and are self-contained solutions.

DE 698 15 649 T2 discloses a method and equipment for the automatic sorting of objects. The equipment comprises a plurality of conveying means platforms which are movable along a route between a loading zone, in which the objects are applied to the platform, and an unloading zone, in which the objects are unloaded from the platforms into one or more collecting devices which are arranged laterally relative to the route, wherein each conveying means platform defines two zones, wherein each of the two zones is configured so as to receive an object, wherein the equipment includes means for modifying a loading order of the objects in the equipment, with the result that the object to be unloaded first is arranged after loading in a zone of the conveying means platform that is situated on the unloading side on which there is a first collecting device for receiving the objects.

DE 602 07 887 T2 discloses a collapsible and size-reducible portable folding table for accommodating in motor homes, aircraft and small accommodation in the collapsed state.

DESCRIPTION OF THE INVENTION

Starting from this situation, it is an object of the present invention to make available a flexible, cost-effective and simple-to-handle package collecting apparatus for package handling installations that is in particular able to be tailored/adapted to different peripheral equipment, functions without complicated control technology and has a high safety standard for operating personnel.

The object of the invention is achieved by the features of the independent claims. Advantageous embodiments are specified in the dependent claims.

Accordingly, the object is achieved by a package collecting apparatus for a package handling installation for unloading a plurality of packages from a transport supply means of the package handling installation and moving unloaded packages to a transport discharge means of the package handling installation, wherein the package collecting apparatus comprises a collecting element, which has a bearing surface for at least one package during the movement from the transport supply means to the transport discharge means, and at least one lateral element arranged thereon which can be moved between an inoperative position and a working position and which has a further bearing surface for at least one package, wherein, with the lateral element in the working position, the bearing surface of the lateral element adjoins the bearing surface of the collecting element flush, and the package collecting apparatus additionally comprises a coupling device for mechanical releasable coupling to the transport discharge means.

The object is additionally achieved by a package handling installation comprising a package collecting apparatus according to the invention, in particular a package collecting apparatus according to the present description or according to one or more of the appended claims.

An essential point of the invention is the interface of the package collecting apparatus to the transport discharge means, which is preferably designed as a telescopic belt conveyor. The interface is designed according to the invention in the form of a coupling device which brings about coupling between the package collecting apparatus and the transport discharge means similarly to the way in which a drill bit is coupled to a drilling machine. In a basic embodiment, the package collecting apparatus substantially consists of two elements, namely the collecting element and the lateral element arranged laterally thereon. In a preferred embodiment, the apparatus according to the invention substantially consists of three elements or units, namely the collecting element and two lateral elements which are preferably formed mirror-symmetrically. These two lateral elements are arranged, for example mounted, on the therefore central collecting element laterally, to the left and right. The central collecting element contains the coupling device for coupling to the transport discharge means, in particular in the form of the telescopic belt conveyor. The working height of the package collecting apparatus is preferably adjustable, in particular individually adjustable.

The package collecting apparatus according to the invention advantageously forms a simple, robust and optionally purely mechanical apparatus which can be coupled to a plurality of different transport discharge means and therefore offers a high degree of flexibility in terms of converting or retrofitting existing package handling installations. The package collecting apparatus according to the invention can advantageously be operated without a control device, which makes it particularly suitable for an implementation in different installations and their control concepts. Expressed in another way, existing complete installations do not have to be adapted or modified in terms of their control when implementing the package collecting apparatus according to the invention, which affords a high cost advantage.

The collecting element can in particular be table-like in form. It has the bearing surface for the packages, which in turn bears and is supported on a substructure/supporting construction/foundation in particular in the form of legs. The bearing surface can be formed in particular by a plate or the like and preferably has a surface structure which allows and facilitates sliding of the packages thereover. Optionally, the bearing surface can have a conveying means or be formed by a conveying means, for example by a conveyor belt or the like. The depositing surface of the collecting element can in particular be inclined toward the transport discharge means such that packages can slide from the collecting element onto the transport discharge means. The collecting element preferably stands on rollers which lower during setup and thus make it possible to ensure a firm and secure footing.

The lateral element is preferably table-like in form or designed as a table or has a table and, in addition to the bearing surface of the collecting element, forms a further bearing surface for the packages. The table or the bearing surface of the lateral element is preferably of such rigid design that an operator can reach a package and grab one or more packages. The positioning of the lateral element between the inoperative position and the working positions can be effected by traction/extension and/or folding in/folding out.

According to a particularly advantageous embodiment, the package collecting apparatus comprises exactly two lateral elements which can be moved between an inoperative position and a working position and which are arranged on mutually opposite sides of the collecting element. The collecting element is thus arranged centrally between the two opposite lateral elements and can be referred to as a central collecting element. The two lateral elements are preferably designed and arranged to be mirror-symmetrical with respect to one another.

It is particularly advantageous if, according to a further embodiment of the invention, the coupling device is designed for raising and lowering the package collecting apparatus. This can mean on the one hand that the coupling device itself brings about raising and lowering or on the other hand that the coupling device is designed to transfer raising and lowering brought about by a separate actuating device to the package collecting apparatus.

Alternatively or additionally, according to a further embodiment, the coupling device can be designed to position the package collecting apparatus in a substantially horizontal direction. The coupling device is preferably designed in such a way that the transport discharge means, in particular in the form of a telescopic belt conveyor, can forwardly and/or backwardly drive/position the package collecting apparatus relative to the transport supply means in order to be able to fully utilize the depth (in the horizontal direction) of the transport supply means, which can be designed in particular for example in the form of an interchangeable container. It can additionally be provided in particular with an overload device which acts in the horizontal direction. Such an overload device makes it possible, below a preferably settable limit load, particularly advantageously to bring about fixed coupling between the package collecting apparatus and the transport discharge means and, upon reaching the limit load in the horizontal direction, to bring about automatic uncoupling of the package collecting apparatus from the transport discharge means. In this way, the overload device represents a safety feature whereby, for example in the case of an inadvertent incorrect positioning of the package collecting apparatus relative to the transport supply device, injury to operators can be avoided. Within the context of the invention, a particularly simple and elegant solution can consist in the coupling device being designed as a slip coupling. The coupling device can in particular be formed eccentrically with the transport discharge means.

According to a further embodiment, with the lateral element in the working position, the bearing surface of the lateral element is inclined in a direction pointing toward the collecting element. In particular, the bearing surface of each lateral element can be inclined toward the central collecting element.

Alternatively or additionally, the bearing surface of the lateral element can be inclined in a direction transversely with respect to the collecting element, in particular be funnel-shaped in form. Consequently, the lateral element is designed in such a way that the packages can slide in the direction of an operator who in the intended manner is situated on that side of the lateral element opposite to the transport supply means. The bearing surface of the lateral element can in particular be formed with a depression into which a package slides, optionally then slides up again on the opposite side and finally remains substantially positionally determined in the region of the depression.

According to a further embodiment, the lateral element is provided with a pull-out device. Such a pull-out device makes it possible for the bearing surface of the lateral element to be increased in an advantageous manner. The pull-out device is preferably a push element which is relatively positionable with respect to the bearing surface of the lateral element, or comprises such a push element. The push element preferably forms a substantially flush and/or planar surface with the bearing surface of the lateral element in the pulled-out state. The pull-out device is preferably arranged on the side of the operator of the lateral element. It can additionally be designed in such a way that it moves out through the pressure of large packages and thereby automatically widens the bearing surface. In a first approximation, the depth (in the horizontal direction) of the bearing surface of the lateral element can be increased from for example approximately 40 cm to approximately 60 cm.

In a further embodiment of the invention, the lateral element has a pivoting element which is relatively positionable with respect to the push element. Said pivoting element can form a substantially flush and/or planar surface together with the push element and the bearing surface of the lateral element in particular in the pivoted-out state. In addition, the lateral element can have a drawer which is arranged below the bearing surface. The drawer can likewise have a pivoting element which serves to be able as required to close a gap situated between the drawer and the table. According to one embodiment, the pivoting element can pivot in and out in particular automatically.

Stabilization of the table with respect to the central collecting element can be achieved by means of a support arranged below the table surface. According to a further embodiment, the package collecting apparatus additionally comprises a folding support for the lateral element.

This is arranged on the collecting element on the one hand and, with the lateral element in the working position, orients and/or fixes its bearing surface as intended. With the lateral element in the inoperative position, the folding support is preferably received in a housing below the bearing surface of the collecting element. By designing the support in the form of a folding support which can be pivoted into a housing when the lateral element is not in use, the apparatus advantageously has only a small space requirement. The folding support preferably has three standing legs which are connected to one another by means of connecting bars. With the lateral element folded in, both the standing legs and the connecting bars of the folding support are situated within the housing. In addition, with the lateral element folded in, the bearing surface can close the housing. The lateral elements are preferably permanently connected to the collecting element or the central collecting element, in particular via the housing.

The technological principle of the invention is as follows: a plurality of packages are generally situated loosely loaded in the transport supply means, preferably in an interchangeable container. By way of the transport discharge means preferably designed as a telescopic belt conveyor, the package collecting apparatus is moved up to/positioned at a front edge (pointing toward the package collecting apparatus) of the packages loosely loaded in the interchangeable container. The lateral element is positionable between a working position and an inoperative position. In the working position, the lateral element is ready for use for receiving packages. The lateral element or both lateral elements is/are initially in the working position. An operator/employee pulls at least one of the packages onto the depositing surface of one of the lateral elements. On this, the packages slide onto the collecting element/the central collecting element and from this onto the transport discharge means. The formation of a pile already occurs with small packages on the lateral element, at the latest with the merging on the collecting element/central collecting element. Such a pile of packages is also referred to as bulk. During the unloading, as a result of a corresponding relative positioning as intended, the package collecting apparatus stands firmly on the transport supply means/the interchangeable container via the coupling device and is mechanically fixedly but releasably connected to the transport discharge means. This connection is preferably configured such that the package collecting apparatus can be forwardly and backwardly moved/positioned in the interchangeable container by the transport discharge means. If an inadvertent incorrect positioning of the package collecting apparatus relative to the interchangeable container (that is to say while the apparatus stands firmly on the interchangeable container) occurs during the operation, this mechanical connection can be released, thereby advantageously increasing the safety for the operating personnel. The coupling device is for example a slip coupling.

If the bulk of the packages in the interchangeable container has been cleared down to the height of the table, the table is in the way of placing the remaining packages on the telescopic belt conveyor. In this case, the possibly present push device is pushed in. The lateral element is then brought into the inoperative position, for example by its bearing surface being raised, the folding support being folded in and the bearing surface being folded downwardly. With the lateral element in the inoperative position, the path is free for the operator to place remaining packages on the central collecting element and/or on the telescopic belt conveyor.

In summary, it can also be said that the central collecting element serves to connect the two lateral elements to the transport discharge means or to the telescopic belt conveyor. It additionally connects the package collecting apparatus to the transport discharge means or to the telescopic belt conveyor by means of the releasable mechanical connection in the form of the coupling device in such a way that the connection is released in the event of inadvertent drawing away of the transport supply means or of the interchangeable container and an operator possibly situated therein is not thrown by the package collecting apparatus out of the transport supply means/the interchangeable container.

According to one embodiment, the depositing surfaces of the collecting element and of the lateral element or of the lateral elements and/or of the push device and/or of the pivoting device can be formed with different degrees of roughness, that is to say different degrees of smoothness, for example as a castor deck or as a perforated plate, etc.

According to a further embodiment, the package handling installation can have an automatic handling device, for example in the form of a multi-axis robot, by means of which an operator can be assisted or replaced. In this case, the package collecting apparatus is preferably additionally provided with a state detection device for packages in the material flow that for example detects the relative position of the packages in relation to the package collecting apparatus and optionally the operating state of the package collecting apparatus. Control parameters for the handling device are calculated from these data by means of a computer unit and used for controlling said device. The package or the packages is or are seized by means of the handling unit and conveyed via the package collecting apparatus to the transport discharge means or the telescopic belt conveyor. Use can be made here of standard commercial multi-axis robots/systems and controllers.

The package collecting apparatus according to the invention differs from known solutions in particular by virtue of the fact that it is a purely mechanical solution and has no controller which is required for unloading. The package collecting apparatus preferably offers two manual workplaces which, for the purposes of adaptability, offers room for example of further automated solutions, for example in the form of a robot to be used.

BRIEF DESCRIPTION OF THE DRAWINGS

The invention will be explained in more detail below with reference to the appended drawings on the basis of preferred exemplary embodiments.

In the drawings

DETAILED DESCRIPTION OF THE EXEMPLARY EMBODIMENTS

The exemplary embodiments described are merely examples which can be modified and/or supplemented in a wide variety of ways within the state of the claims. Any feature which has been described for a specific exemplary embodiment can be used independently or in combination with other features in any other exemplary embodiment. Any feature which has been described for an exemplary embodiment of a specific category can also be used in a corresponding manner in an exemplary embodiment of another category.

Figure 1:
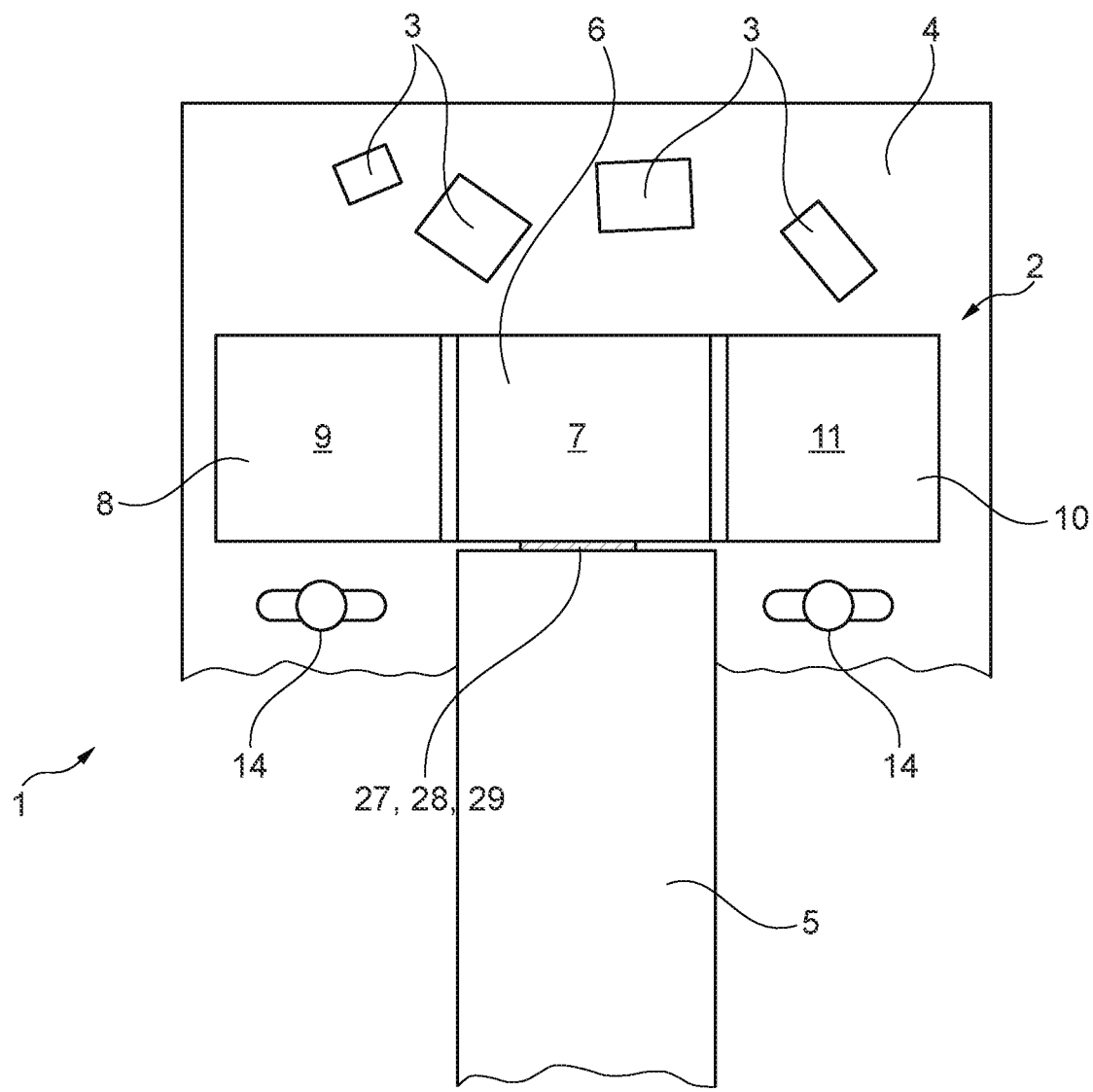
FIG. 1 shows a schematic plan view of an exemplary embodiment of the invention.

FIG. 1 shows a package handling installation 1 comprising a package collecting apparatus 2 according to the invention. The package collecting apparatus 2 serves for unloading a plurality of packages 3 from a transport supply means 4 of the package handling installation 1 and for moving unloaded packages 3 to a transport discharge means 5 of the package handling installation 1. In the present exemplary embodiments, the transport supply means 4 is designed as an interchangeable container 4, whereas the transport discharge means 5 is designed as a telescopic belt conveyor 5 in the present exemplary embodiments.

The package collecting apparatus 2 comprises a collecting element 6 which has a bearing surface 7 for a package 3 during the movement from the transport supply means 4 to the transport discharge means 5. It additionally comprises a first lateral element 8 arranged thereon with a further bearing surface 9 for a package 3 and also comprises a second lateral element 10 arranged thereon with a further bearing surface 11. The lateral element 8 and the lateral element 10 can each be moved between an inoperative position and a working position. With the lateral element 8, 10 in the working position, the bearing surfaces 9 and 11 of the respective lateral elements 8 and 10 adjoin the bearing surface 7 of the collecting element 6 flush.

The package collecting apparatus 2 additionally comprises a coupling device 27 for mechanical releasable coupling to the transport discharge means 5. The coupling device 27 is designed for raising and lowering the package collecting apparatus 2 relative to the interchangeable container 4 in a vertical direction (that is to say in a direction transversely with respect to the drawing plane of FIG. 1). This can occur according to the invention in that either the coupling device 27 itself brings about the raising and lowering of the package collecting apparatus 2 or the coupling device 27 is designed to transfer a raising and lowering brought about by a separate actuating device (not shown in the figures) to the package collecting apparatus 2. In addition, the coupling device 27 is designed for positioning the package collecting apparatus 2 in a substantially horizontal direction (that is to say in the direction of the drawing plane of FIG. 1). The coupling device 27 makes it possible for the package collecting apparatus 2 to be positioned relative to the telescopic belt conveyor 5 in the horizontal and also in the vertical direction. In this way, the depth of the interchangeable container 4 can be fully utilized.

The coupling device 27 is additionally provided with an overload device 28 which acts in the horizontal direction and which, below a settable limit load, brings about fixed coupling between the package collecting apparatus 2 and the telescopic belt conveyor 5 and, upon reaching and exceeding the limit load, brings about automatic decoupling of the package collecting apparatus 2 from the telescopic belt conveyor 5. In one embodiment, the coupling device 27 is designed as a slip coupling 29.

Figure 2A:
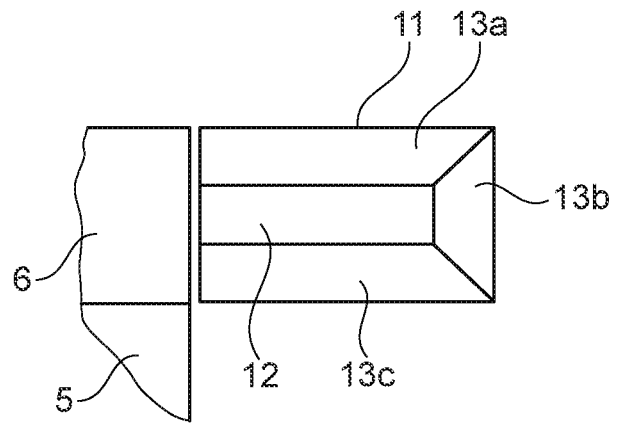
FIGS. 2a-2c show a detail of a lateral element in an exemplary embodiment of the invention in three different directions of view.
Figure 2B:
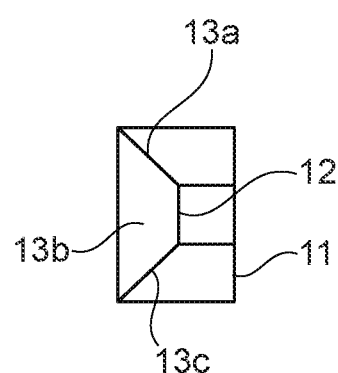
Figure 2C:

In the further exemplary embodiment of FIGS. 2a, 2b and 2c, the bearing surface 9, 11 of the lateral element 8, 10 in the working position is inclined in a direction pointing toward the collecting element 6 in such a way that the corresponding bearing surface 9, 11 slopes down toward the collecting element 6. In addition, the bearing surface 9, 11 of the lateral element 8, 10 is inclined, in subregions, in a direction transversely with respect to the collecting element 6, namely in that it is designed in the form of a funnel with a central portion 12 and edge portions 13a, 13b and 13c inclined with respect to the central portion 12. Consequently, the lateral element 8, 10 is designed in such a way that the packages 3 first of all slide in the direction of an operator 14 who is situated on that side of the corresponding lateral element 8, 10 opposite the interchangeable container 4 (see for example FIG. 1 or FIG. 5). The bearing surface 9, 11 of the lateral element 8, 10 is designed such with a type of depression into which a package 3 slides (via the edge portion 13a), possibly then slides up again onto the opposite side (via the opposite edge portion 13c) and finally remains substantially positionally determined in the region of the depression (on the central portion 12).

Figure 3:
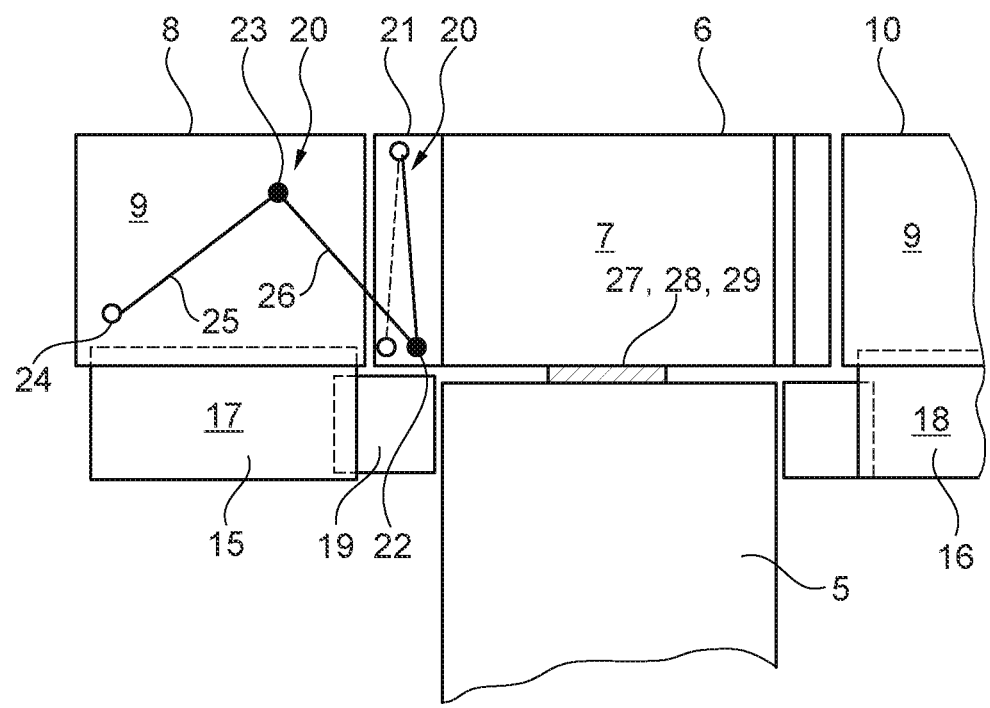
FIG. 3 shows a schematic plan view of a further exemplary embodiment of the invention with a lateral element in a working position.
Figure 4:
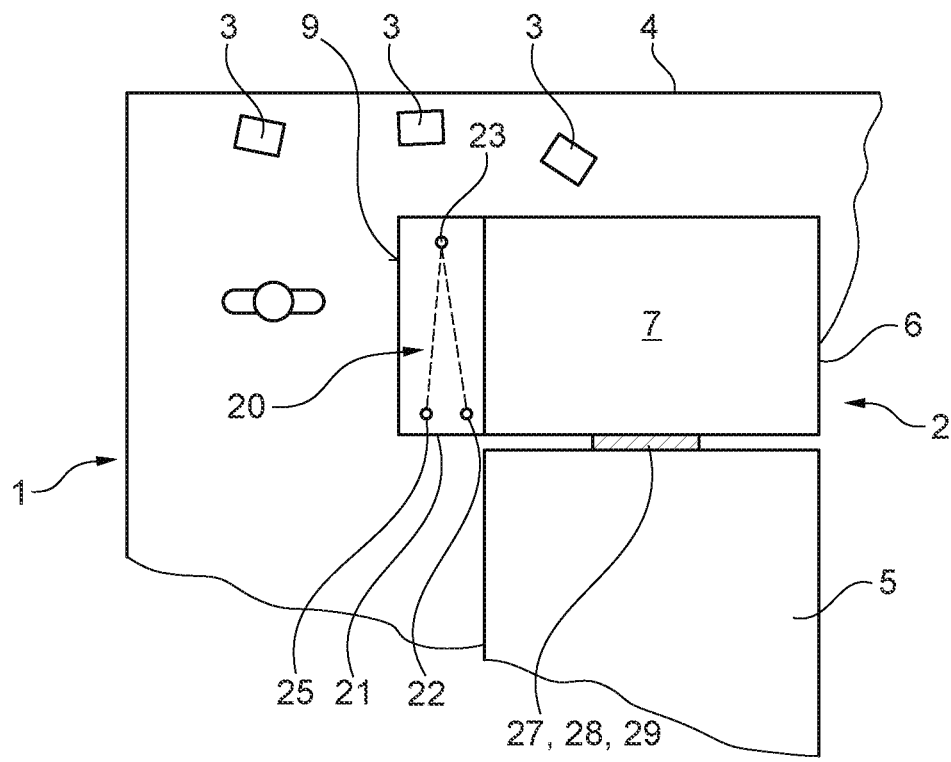
FIG. 4 shows a schematic plan view of the exemplary embodiment of FIG. 3 with a lateral element in an inoperative position.
Figure 5:
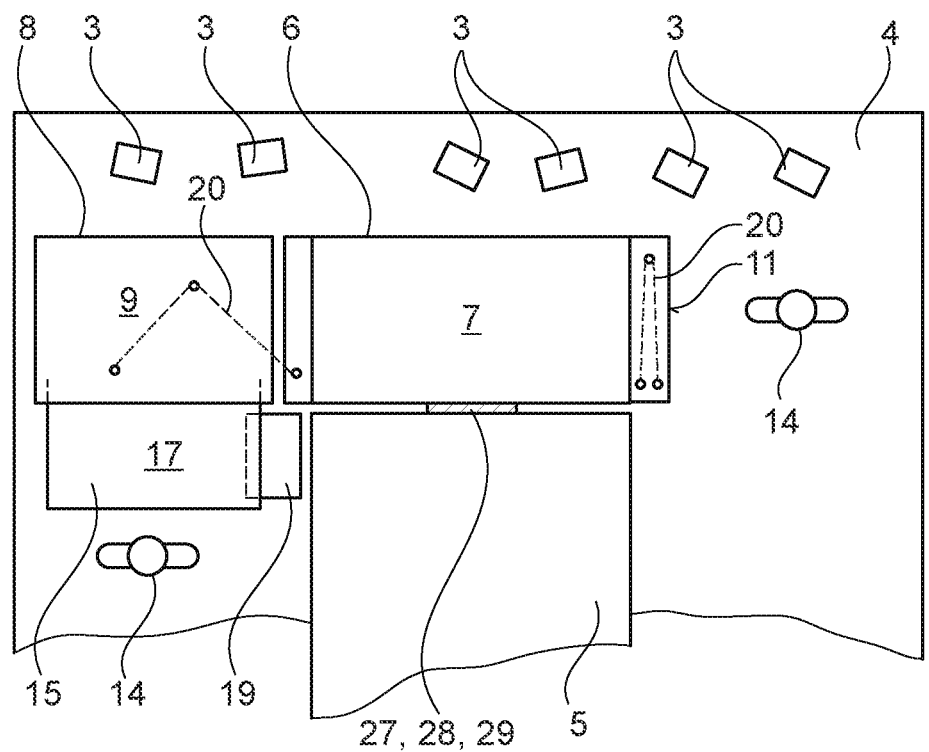
FIG. 5 shows a schematic plan view of a further exemplary embodiment of the invention with a first lateral element in a working position and a second lateral element in an inoperative position.

As is illustrated in FIGS. 3, 4 and 5, the lateral element 8 and/or the lateral element 10 are/is provided with a pull-out device 15 or 16. Such a pull-out device 15, 16 makes it possible for the bearing surface 9, 11 of the lateral element 8, 10 to be increased in an advantageous manner. In the illustrated exemplary embodiment, the pull-out device 15, 16 is a push element 15, 16 which is relatively positionable with respect to the bearing surface 9, 11 of the lateral element 8, 10 and is arranged on the side of the operator 14 of the lateral element. The push element 15, 16 forms a flush and planar bearing surface 17, 18 with the respective bearing surface 9, 11 of the respective lateral element 8, 10 in the pulled-out state. They are each designed in such a way that they move out through the pressure of large packages and automatically widen the bearing surface 9, 11. In a first approximation, the depth d of the bearing surface 9, 11 of the lateral element 8, 10 can increase from for example approximately 40 cm to approximately 60 cm.

The lateral element 8, 10 also has a pivoting element 19 which is relatively positionable with respect to the push element 15, 16. Said pivoting element forms a substantially flush and/or planar surface together with the respective push element 15, 16 and the bearing surface 9, 11 of the respective lateral element 8, 10 in the pivoted-out state (illustrated in FIGS. 3 and 5). The pivoting element 19 serves to close as required a gap situated between the push element 15, 16 and the telescopic belt conveyor 5. In the illustrated exemplary embodiments, the pivoting element 19 pivots in and out automatically.

A stabilization of the lateral element 8, 10 with respect to the collecting element 6 is achieved by means of a support 20 in the form of a folding support 20 that is arranged below the bearing surface 9, 11. Said support is arranged on the collecting element 6 on the one hand and on the respective lateral element 8, 10 on the other hand. With the lateral element 8, 10 in the working position (see FIG. 3 and FIG. 5 on the left), it orients and fixes its bearing surface 9, 11 as intended. With the lateral element 8, 10 in the inoperative position (see FIG. 4 and FIG. 5 on the right), the folding support 20 is received in a housing 21 below the respective bearing surface 7 of the collecting element 6. In such a way, the apparatus 2 advantageously has only a small space requirement. The folding support 20 has three standing legs 22, 23, 24 which are connected to one another by means of connecting bars 25, 26. With the lateral element 8, 10 folded in, both the standing legs 22, 23, 24 and the connecting bars 25, 26 of the folding support 20 are situated within the housing 21. The bearing surface 9, 10 closes the housing 21 with the lateral element 8, 10 folded in.

FIG. 5 shows the apparatus 2 or installation 1 according to the invention in an operating state in which, on the left-hand side, a pile of packages 3 still projects over the height of the lateral element 8, with it being the case, however, that the pile of packages 3 in the interchangeable container 4 on the right-hand side has already been cleared down to the height of the lateral element 10. In this state, the lateral element 11 constitutes an obstacle during further movement of packages 3 from the interchangeable container 4 to the telescopic belt conveyor 5, for which reason the pull-out device 16 has been pushed in. The lateral element 10 has then been moved into the illustrated inoperative position by its bearing surface 11 having been raised, the folding support 20 folded in and the bearing surface 11 folded downwards. The path is thereby free for the operator 14 to place remaining packages 3 on the central collecting element 6 and/or on the telescopic belt conveyor 5.

The exemplary embodiments described are merely examples which can be modified and/or supplemented in a wide variety of ways within the state of the claims. Any feature which has been described for a specific exemplary embodiment can be used independently or in combination with other features in any other exemplary embodiment. Any feature which has been described for an exemplary embodiment of a specific category can also be used in a corresponding manner in an exemplary embodiment of another category.

LIST OF REFERENCE SIGNS

Package handling installation 1
Package collecting apparatus 2
Package, packages 3
Transport supply means, interchangeable container 4
Transport discharge means, telescopic belt conveyor 5
Collecting element 6
Bearing surface 7
Lateral element 8
Bearing surface 9
Lateral element 10
Bearing surface 11
Central portion 12
Edge portion 13a, 13b, 13c
Operator 14
Pull-out device, push element 15
Pull-out device, push element 16
Bearing surface 17
Bearing surface 18
Pivoting element 19
Support, folding support 20
Housing 21
Standing leg 22
Standing leg 23
Standing leg 24
Connecting bar 25
Connecting bar 26
Coupling element 27
Overload Device 28
Slip Coupling 29

The invention claimed is:

1. Package collecting apparatus for a package handling installation for unloading a plurality of packages from a transport supply means of the package handling installation and for moving unloaded packages to a transport discharge means of the package handling installation, wherein:
the package collecting apparatus comprises a collecting element, wherein the collecting element has a bearing surface for at least one package during the movement from the transport supply means to the transport discharge means, and the package collecting apparatus further comprises at least one lateral element arranged on the collecting element, wherein the at least one lateral element can be moved between an inoperative position and a working position and has a further bearing surface for at least one package, and
wherein, in a state where the at least one lateral element is in the working position, the bearing surface of the at least one lateral element adjoins the bearing surface of the collecting element flush,
wherein the package collecting apparatus additionally comprises a coupling device for mechanical releasable coupling of the collecting element to the transport discharge means
wherein the coupling device is designed to position the collecting element in a substantially horizontal direction and is provided with an overload device,
wherein the overload device acts in the horizontal direction and, below a settable limit load, brings about fixed coupling between the collecting element and the transport discharge means and, upon reaching the limit load in the horizontal direction, brings about automatic uncoupling of the collecting element from the transport discharge means.

2. Package collecting apparatus according to claim 1, wherein the at least one lateral element comprises two lateral elements, wherein the two lateral elements can be moved between an inoperative position and a working position and are arranged on mutually opposite sides of the collecting element.

3. Package collecting apparatus according to claim 1, wherein the coupling device is designed as a slip coupling.

4. Package collecting apparatus according to claim 1, wherein, with the at least one lateral element in the working position, the bearing surface of the at least one lateral element is inclined in a direction pointing toward the collecting element.

5. Package collecting apparatus according to claim 1, wherein the bearing surface of the at least one lateral element is inclined in a direction transversely with respect to the collecting element, and is funnel-shaped in form.

6. Package collecting apparatus according to claim 1, wherein the at least one lateral element is provided with a pull-out device by means of which the bearing surface of the at least one lateral element can be increased, wherein the pull-out device comprises a push element which is relatively positionable with respect to the bearing surface of the at least one lateral element and which forms a substantially flush and/or planar surface with the bearing surface of the at least one lateral element in the pulled-out state.

7. Package collecting apparatus according to claim 6, additionally having a pivoting element which is relatively positionable with respect to the push element and which, in the pivoted-out state, forms a substantially flush and/or planar surface together with the push element and the bearing surface of the at least one lateral element.

8. Package collecting apparatus according to claim 1, additionally comprising a folding support, wherein the folding support is arranged on the collecting element on the one hand and, with the at least one lateral element in the working position, orients and/or fixes the bearing surface of the at least one lateral element as intended and, with the at least one lateral element in the inoperative position, is accommodated in a housing below the bearing surface of the collecting element.

9. Package handling installation comprising a transport discharge means in the form of a telescopic belt conveyer and a package collecting apparatus according to claim 1.

10. Package handling installation according to claim 9, wherein the collecting element is releasably coupled to the transport discharge means by means of the coupling device.

11. Package handling installation according to claim 10, comprising a transport supply means, wherein the package collecting apparatus is relatively positionable in the vertical and/or horizontal direction to the transport supply means, by means of the transport discharge means.

* * * * *